(12) United States Patent
Starbuck

(10) Patent No.: US 10,375,929 B2
(45) Date of Patent: Aug. 13, 2019

(54) EQUINE TWITCH

(71) Applicant: Lucy Starbuck, Alva, FL (US)

(72) Inventor: Lucy Starbuck, Alva, FL (US)

( * ) Notice: Subject to any disclaimer, the term of this patent is extended or adjusted under 35 U.S.C. 154(b) by 0 days.

(21) Appl. No.: 15/726,507

(22) Filed: Oct. 6, 2017

(65) Prior Publication Data

US 2018/0027769 A1 Feb. 1, 2018

Related U.S. Application Data

(63) Continuation-in-part of application No. 15/042,929, filed on Feb. 12, 2016.

(60) Provisional application No. 62/117,642, filed on Feb. 18, 2015.

(51) Int. Cl.
*A01K 15/00* (2006.01)
*B68B 1/00* (2006.01)

(52) U.S. Cl.
CPC ............ *A01K 15/00* (2013.01); *A01K 15/003* (2013.01); *B68B 1/00* (2013.01)

(58) Field of Classification Search
CPC .............................. A01K 15/00; A01K 15/003
USPC ............................................... 119/800; 54/71
See application file for complete search history.

(56) References Cited

U.S. PATENT DOCUMENTS

| | | | | |
|---|---|---|---|---|
| 3,747,569 A * | 7/1973 | Hannon | ................ | A01K 15/00 119/800 |
| 4,252,085 A * | 2/1981 | Barker | .................. | A01K 15/00 119/800 |
| 6,058,686 A | 5/2000 | Wheeler | | |
| 6,260,338 B1 | 7/2001 | Wheeler | | |

* cited by examiner

*Primary Examiner* — Yvonne R Abbott-Lewis
(74) *Attorney, Agent, or Firm* — William Gray Mitchell

(57) ABSTRACT

A clip-style equine twitch device comprising a clip head and in-line tether holes, each threaded with a section of rope or cord to form an adjustable loop that can be applied to the horse and then securely clipped to an anchor point, and a method of use thereof.

17 Claims, 3 Drawing Sheets

EQUINE TWITCH

CROSS REFERENCE TO RELATED APPLICATIONS

This patent application claims priority to U.S. provisional patent application 62/117,642, filed Feb. 18, 2015, and U.S. utility patent Ser. No. 15/042,929, filed Feb. 12, 2016, the contents of which are incorporated herein in their entirety.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a clip-style equine twitch device for providing short term tranquilization or restraint of a horse.

Background of the Invention

An equine twitch or "rope twitch" is an implement for applying pressure to the upper lip or nose of a horse, thereby releasing endorphins and temporarily calming the horse during an activity or procedure that could otherwise be upsetting to the animal. The use of twitches has long been known in equine husbandry and various designs continue in use today.

The twitch has historically been believed to work by distracting the horse, but may act instead by triggering the release of endorphins from the horse's brain, thereby producing a calming effect. The twitch is considered a humane method of restraint and is commonly used by horse owners, trainers and veterinarians to keep an animal still and quiet, thus enabling its handler to perform other tasks such as saddling, grooming or giving medical attention to the animal.

A classic rope twitch design has comprised a stick-like handle with a loop of chain or rope on the end. In the classic maneuver, a person reaches through the rope loop of the twitch to grasp the upper lip of the horse, then slides the loop from his or her wrist area over and past his hand, and around the horse's lip. Once the loop is in place around the horse's lip, the stick or ring is twisted repeatedly in a circular motion, thus twisting the rope and applying gradually increasing pressure to the lip until the horse is properly sedated.

Another design, sometimes called a "humane" twitch, is a plier-like clamp that resembles a metal nutcracker both in appearance and design, although it is typically one and a half to two feet in length. In this variety of twitch, the open end of the pliers is brought down over the horse's top lip from above, with the two handles facing the ground, and the handles are slowly brought together to close the device around the horse's lip.

Other alternative versions of the equine twitch can employ either a screw-closing mechanism, or even duct tape.

Classic designs of twitch require constant holding of the handle(s) by the operator. Since a twitch is employed as a means of quieting the horse so that another task may be performed, the requirement that the operator keep at least one hand on the twitch handle at all times severely limits any secondary motions or positioning that the operator may need to simultaneously perform. Equally problematic, a requirement that the operator keep hold of the twitch may cause injury to the operator if the horse throws its head or executes another sudden movement.

In an effort to overcome such problems, known twitches have been designed to comprise metal bars and hinges to encircle the horse's head. Such designs tend to be heavy, unwieldy, and difficult or dangerous to engage.

Another difficulty with known twitch designs is that they involve handles or mechanisms that are overlarge and therefore cumbersome to carry and store. The usual design of a stick twitch or humane twitch is in the range of two feet long or longer. Thus, the operator may be forced to make one trip carrying the twitch itself, then a second trip carrying whatever equipment is required for the operation to be performed following application of the twitch.

What is needed is a twitch that is small enough to store and carry easily, simple and inexpensive to manufacture, and simple to engage around a horse's lip without requiring the handler to maintain his or her grip on the twitch to maintain pressure.

BRIEF SUMMARY OF THE INVENTION

In a preferred embodiment, an equine twitch comprising a clip body with a proximal end comprising a clip head and a distal end comprising a proximal tether mount and a distal tether mount, wherein each tether mount has a tether hole centered inside of it, and wherein a rope is threaded through each such hole to create a loop.

In another preferred embodiment, the equine twitch as described herein, wherein the tether holes open in line with a clip gate, which clip gate opens to give access to the clip head.

In another preferred embodiment, the equine twitch as described herein, wherein the rope comprises a first rope end and a second rope end, each of which extends in the same direction through a separate tether hole, and wherein such first and second rope ends are connected by a knot.

In another preferred embodiment, the equine twitch as described herein, wherein the knot is taken from a group consisting of a bowline, sheet bend, figure 8 bend, double fisherman's, reef or square knot.

In another preferred embodiment, the equine twitch as described herein, wherein the edges of each tether mount around its associated tether hole, creating an intermount area around which excess rope or cord may be twisted when applying the twitch to the lip of a horse.

In another preferred embodiment, the equine twitch as described herein, wherein the clip head further comprises a self-closing bolt snap clip gate that closes a cavity within the clip head, which clip gate is attached to a clip lever allowing the clip gate to slide open, and wherein a spring located inside the clip body closes the clip gate upon release of the clip lever.

In another preferred embodiment, the equine twitch as described herein, wherein the clip head is in the form of a self-closing, hinged carabiner covering a cavity within the clip head.

In another preferred embodiment, the equine twitch as described herein, wherein the tether holes in the distal end are arranged in line both with each other and with the clip head.

In another preferred embodiment, the equine twitch as described herein, wherein the clip body is made of metal.

In another preferred embodiment, the equine twitch as described herein, wherein the rope is paracord.

In another preferred embodiment, the equine twitch as described herein, wherein the distal end of the clip body comprises a single tether hole or split hole through which both ends of the rope or cord are threaded.

In another preferred embodiment, the equine twitch as described herein, wherein one or both ends of the rope is threaded through a rope length adjuster after threading through the tether hole(s).

In another preferred embodiment, the equine twitch as described herein, wherein the clip body measures between four and eight inches in length, from proximal end to distal end.

In another preferred embodiment, the equine twitch as described herein, wherein the opening of the clip head is between one half inch and one inch.

In another preferred embodiment, the equine twitch as described herein, wherein the diameter of the cavity within the clip head is one and one-quarter inches or less.

In another preferred embodiment, the equine twitch as described herein, wherein the distance between the tether mounts is between one half inch and two inches.

In another preferred embodiment, a method of use of the equine twitch of claim 1, comprising wherein the horse handler follows the steps: placing the looped rope or cord around the upper lip of the horse, adjusting the length of the rope to accommodate the horse's lip and the distance from the horse's lip to an anchor point, twisting the clip component to tighten the loop to create the desired amount of pressure to tranquilize the horse, and clipping the clip head of the twitch onto an anchor point, thus securing the applied twitch in position while allowing the handler the free use of both hands for a secondary procedure.

In another preferred embodiment, the method of use as described herein, wherein the rope length adjustment is accomplished with the use of a knot taken from the group consisting of a bowline, sheet bend, figure 8 bend, double fisherman's, reef or square knot.

In another preferred embodiment, the method of use as described herein, wherein a portion of excess rope from the rope length adjustment is twisted around the clip body at the intermount area.

DETAILED DESCRIPTION OF THE INVENTION

Figure 1:
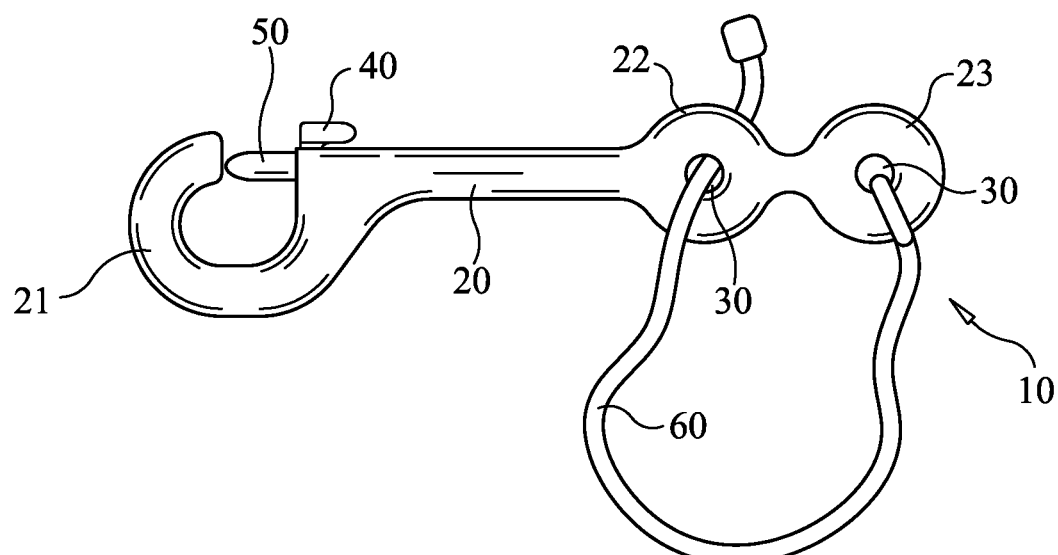
FIG. 1 is a line drawing evidencing a side view of the clip-style, bolt snap twitch in concert with a rope or cord threaded through the clip's two in-line tether holes to create an adjustable loop.

The invention is an equine twitch comprising rope attached to a clip body with a proximal end, such proximal end comprising a clip head that may be opened and closed by a clip mechanism, and a distal end comprising two tether holes arranged side-by-side, allowing the rope or cord to be threaded through each such hole to create a loop. The edges of the distal side of the clip body protrude around each tether hole, creating proximal and distal tether mounts with an intermount area between them.

In a preferred embodiment, the clip mechanism will comprise a spring-action bolt snap which can be opened with a single thumb or finger, and closes automatically to enclose the cavity within the clip head. Spring-action bolt snap clips are well known in the equine field and in general. Such a mechanism comprises a clip body, usually metal, with a curved end open on one side allowing that end to be hooked onto another object. The open side is opened and closed using a clip gate, preferably embodied as a metallic pin that retracts within the clip body upon sliding in a distal direction by the operator. Within the recess into which the clip gate is retracted, a spring is located that acts to push the gate piece in a proximal direction and into the closed position during times when the user is not actively retracting the clip gate. Attached to or integrated with such clip gate is a clip lever, embodied as a protrusion emanating outward from the clip body and extending in a distal direction. It is the clip lever to which the operator may apply pressure with a finger or thumb, sliding it distally through a slot in the clip body, to open the clip gate against the pressure of the spring. Metallic clip bodies may be constructed of any appropriate metal or alloy, including without limitation brass, steel, stainless steel, aluminum, or zinc-aluminum alloys. In an alternative embodiment, the clip body can be constructed of plastic.

In another preferred embodiment, the clip mechanism is in the form of a hinged carabiner. Again, carabiner-style clips are well known, and available from many commercial sources. As opposed to the spring-action bold, a carabiner is a hinged gate which swings inward when pushed into the open area within the clip head, and is spring-loaded to snap outward into a closed position when the applied pressure is released.

In one embodiment, the two in-line tether holes are arranged in line both with each other and with the clip head, such that each hole opens in the same direction, and the clip gate opens at a 30 to 90 degree rotation with respect to such in-line tether holes.

In a more preferred embodiment, the two in-line tether holes are both arranged to open in the same direction as the clip gate. This design is especially useful to the handler since, after the rope has been twisted around the horse's lip, the bolt snap can be easily clipped to the side ring of a standard halter and the slide bolt and opening will then face away from the horse. This constitutes an improvement over devices wherein the clip gate opens sideways to the tether holes, which can cause rotational force on the bolt snap opening when the bolt snap is anchored to the halter, leading to the occasional inconvenient or even dangerous opening of the bolt snap and/or release of the rope while the handler's tending to the horse was still in process.

In a preferred method of use, the rope length adjuster(s) are used to adjust the rope to the correct length for twitching the horse's lip and securing the clip body to the horse halter or other anchor point, with excess cord left hanging while the twitch is applied. In an alternate method of use, excess rope or cord may be twisted around the intermount area when applying the rope to the horse's lip and securing the clip head, and thus remain twisted about the clip body instead of hanging free.

In various embodiments, the rope may be made of any commercially available fiber, including without limitation hemp, cotton, linen or other known natural material, or nylon, polyester, polyethylene, aramids or other known synthetic material. Further, such rope may be laid, twisted, woven, braided, plaited, or constructed with any method known in the art. In an alternative embodiment, the rope is paracord. In another embodiment, wire rope or metallic chain could replace the rope.

The diameter of the rope will vary depending on the size of the horse to be twitched. Preferred diameters may range from 0.5" to 2.0", which smaller sized ropes being more appropriate for smaller-sized animals. More preferably, the rope diameter is 0.5" to 1.0". Tether holes would be sized to accommodate the appropriate rope diameters.

In its primary embodiment, the horse handler would wrap the looped rope or cord around the upper lip of the horse, then twist the clip component to tighten the loop and adjust its size to create the desired amount of pressure to tranquilize the horse without causing discomfort. The clip head on the proximal end of the twitch will then be clipped onto one of the metal rings on the side of the horse's halter or bridle, or to another available anchor position, thus securing the loop in position while allowing the handler the free use of both hands for whatever subsequent procedure is intended.

In another preferred embodiment, one or both ends of the rope or cord, after being threaded through the tether holes, are then threaded through a rope length adjuster, embodied as a metallic or plastic sliding cord lock, toggle spring or similarly known and commercially available device. Such locking devices typically allow for sliding over a cord with the press of a button, and then lock upon the button's release. In such a configuration, the rope length adjuster would be larger in diameter than the associated tether hole.

By tying or otherwise permanently securing a first end of the rope to one of the two tether mounts via the tether hole centered therein, threading the second rope end through the alternate tether hole and attaching the rope length adjuster to such second rope end, the rope itself can be made adjustable. For a rope length adjuster that is a sliding cord lock or toggle spring, attachment would be effected by sliding the rope length adjuster over the end of the rope and towards the tether hole, then locking the rope length adjuster to cinch the rope at the point allowing for the proper rope length for a given horse.

In alternate more preferred embodiment, a knot in the rope itself could function as the rope length adjuster. Any known knot for attaching two rope lengths will suffice, including but not limited to a bowline, sheet bend, figure 8 bend, double fisherman's, reef or square knot. In such an embodiment, it is not necessary to tie or otherwise secure one end of the rope to a tether hole or otherwise to the clip body. In this embodiment, the rope is simply threaded through each tether hole such that the two free ends extend through to the same side, allowing such free ends to be tied to one another, forming a rope circle that can be applied to the horse's lip. The use of a knot simplifies the device by reducing the number of components needed to produce the twitch and reducing the number of components that may break or become dislodged during use.

The clip body itself can vary in length and size depending on the size of the animal to be twitched. Larger and smaller designs are possible to account for larger or smaller animals. In a preferred embodiment, the clip body will measure between two and twelve inches in length. In a more preferred embodiment, the metal clip body is between four and eight inches in length. The opening of the clip component will preferably be between one half inch and one inch, and the diameter of the recess within the clip component will preferably be one and one-quarter inches or less. The distance between the tether mounts will preferably be between one half inch and four inches, with a more preferred distance of one to two inches.

In another embodiment, the distal end of the twitch may comprise a single tether hole through which both ends of the rope or cord are threaded, and then are either tied off or threaded through one or more rope length adjusters.

In still another preferred embodiment, the distal end of the twitch could comprise a split tether hole, for example comprising two semicircular holes with their flat sides facing each other.

In the embodiments described herein, the inventive twitch device provides users with a twitch that is easy to store and carry, simple and inexpensive to manufacture, and easy to use. Unlike known twitch devices, which require hand carrying due to their size and length, the device disclosed herein can be carried in the user's pocket or clipped to a belt or belt loop, leaving the user's hands free to carry necessary grooming or veterinary equipment to perform the tasks for which the horse is being twitched.

The materials used in the subject twitch design also allow for simple sterilization of each such component to combat the passing of germs or infections from one horse to another. Preferred methods of sterilization can include the use of boiling or application of disinfectants to such components.

Also unlike known twitch designs, the disclosed device allows for the twitch to be applied and then secured on a "hands free" basis. Previously, the sequential operations of twitching a horse and then performing the procedure for which the horse is being twitched required either two persons to perform the separate procedures, or required the person twitching the horse to perform the secondary procedure one-handed. By allowing the adjustable rope component to be applied and then secured in place, and the clip head of the twitch to be attached to the horse's halter, bridle or a similar anchor point upon application, the user is then allowed to move to any part of the horse with both hands free while the twitch remains in place, enhancing both the operator's efficiency and safety.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

DETAILED DESCRIPTION OF THE DRAWINGS

FIG. 1 is a line drawing evidencing a preferred embodiment of the clip-style twitch device 10, in which a single, integrated formed metal component clip body 20 comprises a proximal end where a clip head 21 is located, and a distal end where two sequential protuberances, proximal tether mount 22 and distal tether mount 23, are located. Between the two tether mounts 22, 23 is the intermount area 25, which is useful as a stem around which a rope 60 can be wound during the twisting process. Centered within each of proximal tether mount 22 and distal tether mount 23 is an in-line tether hole 30. Each such hole is large enough to accommodate the diameter of the rope 60, which will be secured therein to form a loop which will be used to encircle the upper lip of a horse. In the embodiment of FIG. 1, the end of the rope 60 is threaded through tether hole 30 within the distal tether mount 23 and tied off, while the other end of the rope is threaded through the tether hole of proximal tether mount 22, and then through rope length adjuster 80, which can slide up and down over the rope to adjust the length of the rope to fit an individual horse.

Figure 2:
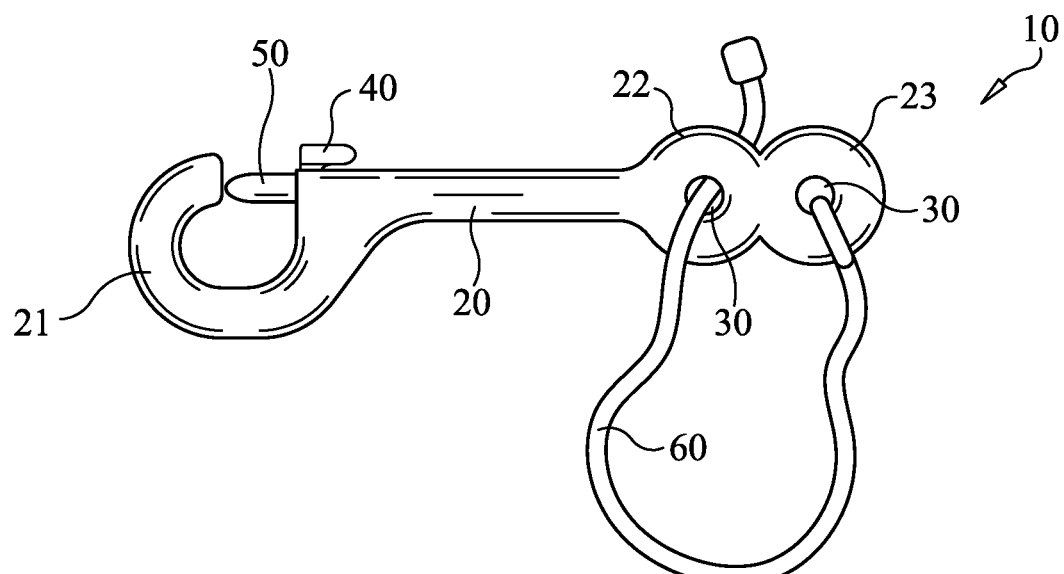
FIG. 2 is a line drawing evidencing a side view of an alternate embodiment of the clip-style twitch with an alternate configuration of the two in-line tether holes.

FIG. 2 is a line drawing evidencing an alternative embodiment of the clip-style twitch device 10 of FIG. 1. In this embodiment, intermount area 25 has been removed and the two tether mounts 22, 23 have been placed directly adjacent to one another to form a figure-8 arrangement. This arrangement could be useful for smaller twitch designs for smaller animals, utilizing a thinner and/or shorter rope 60.

Figure 3:
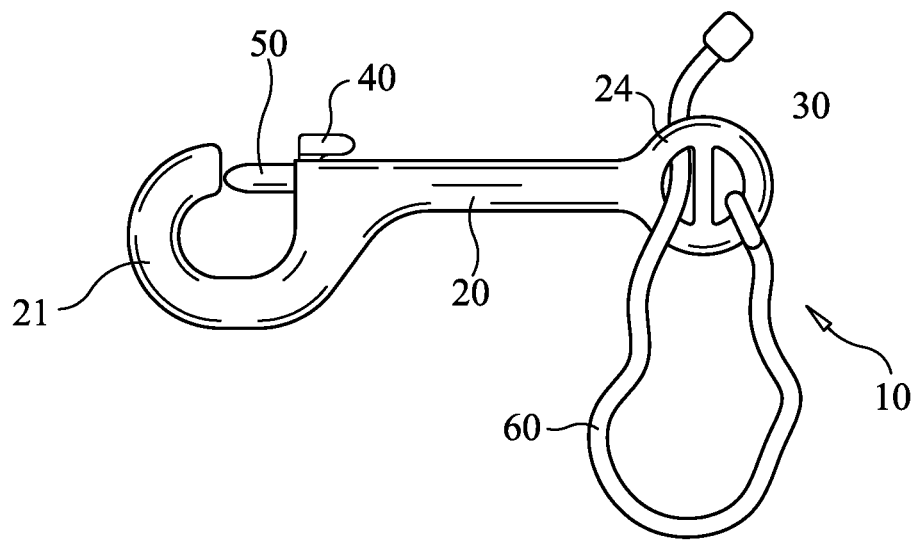
FIG. 3 is a line drawing evidencing a side view of another alternate embodiment of the clip-style twitch with another alternate configuration of the two in-line tether holes.

FIG. 3 is a line drawing evidencing another alternative embodiment of the clip-style twitch device 10 of FIG. 1, wherein the two tether mounts have been replaced with a single tether mount 24 of a circular or ovular configuration, in which the in-line tether holes 30 are placed directly next to one another, with each tether hole 30 designed as a semicircle, with the flat sides of such holes facing one another.

Figure 4:
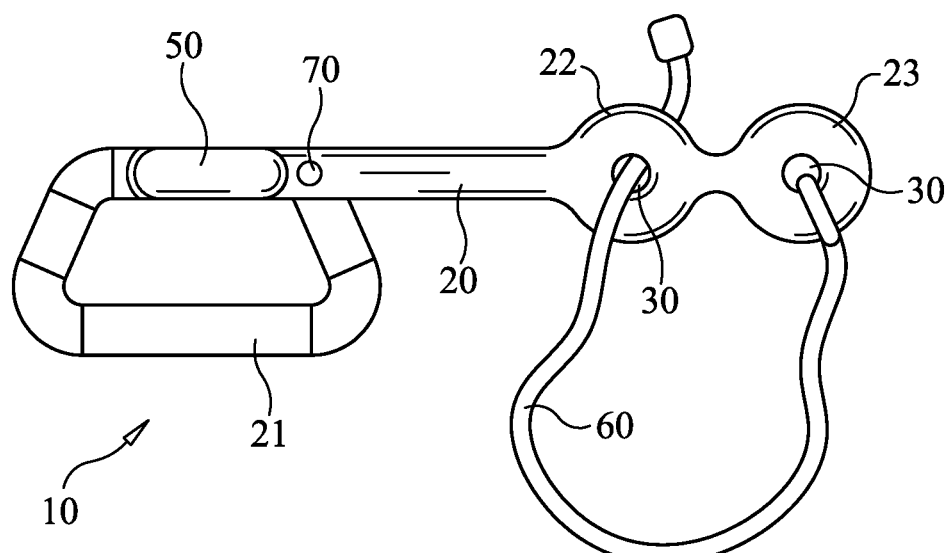
FIG. 4 is a line drawing evidencing a side view of another alternate embodiment of the clip-style twitch with a carabiner-style clip mechanism.

FIG. 4 is a line drawing evidencing another alternative embodiment of the clip-style twitch device 10 of FIG. 1, comprising a carabiner-style clip head 21 instead of a bolt-action style. In this iteration, the clip gate 50 swings inward via hinge 70 when subjected to pressure from without, allowing it to clip onto an anchoring object, then self-closes due to spring action upon the release of such pressure.

Figure 5:
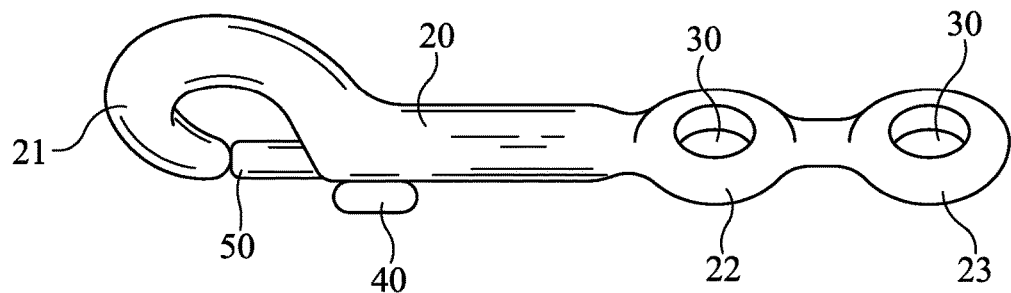
FIG. 5 is a line drawing evidencing a perspective view of a preferred embodiment of the clip-style twitch in which the two in-line tether holes open in line with the clip gate.

FIG. 5 is a line drawing evidencing another preferred embodiment of the clip-style twitch device 10 of FIG. 1, wherein the tether holes 30 are each aligned so that they open approximately in-line, in the same direction as clip gate 50.

Figure 6:
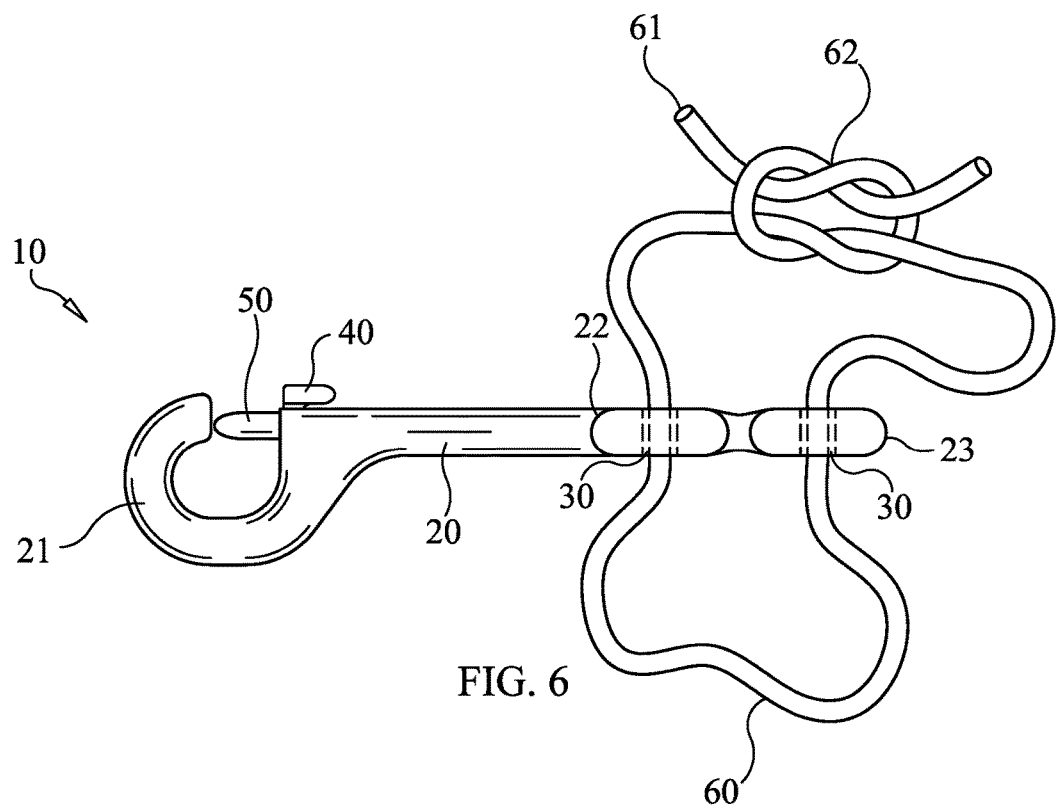
FIG. 6 is a line drawing evidencing a side view of the clip-style twitch of FIG. 5 with a rope component threaded through the in-line holes and knotted.

FIG. 6 is a line drawing evidencing the clip-style twitch embodiment of FIG. 5, further comprising rope 60. In this configuration, the rope 60 is not secured directly to the clip body 20, but is threaded through each of the approximately in-line tether holes 30 such that the free ends 61 of the rope 60 extend in the same direction in which clip head 21 opens. FIG. 5 further shows the rope ends 61 secured to one another via knot 62, pictured therein for purposes of illustration only as a square knot. Other preferred knots include but are not limited to a bowline, sheet bend, figure 8 bend, double fisherman's, or reef knot.

In each of FIGS. 1-6, the spring acting on the clip gate 50 is located within the clip body 20, and thus is not pictured.

LIST OF REFERENCE NUMBERS 10 clip-style twitch device
20 clip body
21 clip head
22 proximal tether mount
23 distal tether mount
24 single tether mount
25 intermount area
30 tether holes (2)
40 clip lever
50 clip gate
60 rope
61 rope ends
62 knot
70 hinge
80 rope length adjuster The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. An equine twitch comprising a clip body with a proximal end comprising a clip head and a distal end comprising a proximal tether mount and a distal tether mount, wherein each tether mount has a tether hole centered inside of it, wherein a rope is threaded through each such hole to create a loop and the tether holes open in line with a clip gate, which clip gate opens to give access to the clip head.

2. The equine twitch of claim 1, wherein the rope comprises a first rope end and a second rope end, each of which extends in the same direction through a separate tether hole, and wherein such first and second rope ends are connected by a knot.

3. The equine twitch of claim 2, wherein the knot is taken from a group consisting of a bowline, sheet bend, figure 8 bend, double fisherman's, reef or square knot.

4. The equine twitch of claim 1, wherein the edges of each tether mount around its associated tether hole, creating an intermount area around which excess rope or cord may be twisted when applying the twitch to the lip of a horse.

5. The equine twitch of claim 1, wherein the clip head further comprises a self-closing bolt snap clip gate that closes a cavity within the clip head, which clip gate is attached to a clip lever allowing the clip gate to slide open, and wherein a spring located inside the clip body closes the clip gate upon release of the clip lever.

6. The equine twitch of claim 1, wherein the clip head is in the form of a self-closing, hinged carabiner covering a cavity within the clip head.

7. The equine twitch of claim 1, wherein the tether holes in the distal end are arranged in line both with each other and with the clip head.

8. The equine twitch of claim 1, wherein the clip body is made of metal.

9. The equine twitch of claim 1, wherein the rope is paracord.

10. The equine twitch of claim 1, wherein the distal end of the clip body comprises a single tether hole or split hole through which both ends of the rope or cord are threaded.

11. The equine twitch of claim 1, wherein one or both ends of the rope is threaded through a rope length adjuster after threading through the tether hole(s).

12. The equine twitch of claim 1, wherein the clip body measures between four and eight inches in length, from proximal end to distal end.

13. The equine twitch of claim 1, wherein the opening of the clip head is between one half inch and one inch.

14. The equine twitch of claim 1, wherein the diameter of the cavity within the clip head is one and one-quarter inches or less.

15. The equine twitch of claim 1, wherein the distance between the tether mounts is between one half inch and two inches.

16. A method of use of the equine twitch of claim 1, comprising wherein the horse handler follows the steps: placing the looped rope or cord around the upper lip of the horse, adjusting the length of the rope to accommodate the horse's lip and the distance from the horse's lip to an anchor point, twisting the clip component to tighten the loop to create the desired amount of pressure to tranquilize the horse, and clipping the clip head of the twitch onto an anchor point, thus securing the applied twitch in position while allowing the handler the free use of both hands for a secondary procedure and wherein the rope length adjustment is accomplished with the use of a knot taken from the group consisting of a bowline, sheet bend, figure 8 bend, double fisherman's, reef or square knot.

17. The method of use of claim 16, wherein a portion of excess rope from the rope length adjustment is twisted around the clip body at the intermount area.

* * * * *